(12) United States Patent
Hoover et al.

(10) Patent No.: US 10,810,531 B2
(45) Date of Patent: Oct. 20, 2020

(54) SYSTEMS AND METHODS FOR VEHICLE TRACKING AND SERVICE PREDICTION

(71) Applicant: CAPITAL ONE SERVICES, LLC, McLean, VA (US)

(72) Inventors: Jason Hoover, Grapevine, TX (US); Qiaochu Tang, The Colony, TX (US); Avid Ghamsari, Plano, TX (US); Souvik Das, San Jose, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/870,266

(22) Filed: Jan. 12, 2018

(65) Prior Publication Data

US 2018/0137474 A1    May 17, 2018

Related U.S. Application Data

(63) Continuation of application No. 15/268,489, filed on Sep. 16, 2016.
(Continued)

(51) Int. Cl.
*G06Q 30/02* (2012.01)
*G06Q 10/06* (2012.01)
(Continued)

(52) U.S. Cl.
CPC ... *G06Q 10/0637* (2013.01); *G06Q 10/06375* (2013.01); *G06Q 30/0206* (2013.01);
(Continued)

(58) Field of Classification Search
CPC ......... G06Q 10/0637; G06Q 10/06375; G06Q 30/0206; G07C 5/0841
(Continued)

(56) References Cited

U.S. PATENT DOCUMENTS

| | | | |
|---|---|---|---|
| 2005/0131597 A1* | 6/2005 | Raz | G07C 5/085 701/29.1 |
| 2009/0005927 A1* | 1/2009 | Schlatre | G06Q 10/06 701/29.5 |

(Continued)

OTHER PUBLICATIONS

Albright, Plugging Into the Telematics Opportunity, Automotive Body Repair Network, Mar. 24, 2014 (Year: 2014).*

*Primary Examiner* — Charles Guiliano
(74) *Attorney, Agent, or Firm* — Finnegan, Henderson, Farabow, Garrett & Dunner, LLP

(57) ABSTRACT

This disclosure relates generally to vehicle diagnostics, and more particularly to systems and methods for vehicle tracking and service prediction. In one embodiment, a processor-implemented vehicle tracking and prediction method is disclosed. The method includes sending an electronic signal to activate in-vehicle data collection by an on-board data aggregator disposed in communication with each of an on-board vehicle computer, via an on-board diagnostic port, and one or more user devices. The method further includes receiving, aggregated in-vehicle data from the on-board data aggregator, predicting a future vehicle service event based on the aggregated data, and generating a vehicle valuation metric based on the aggregated data. The method further includes sending a notification to at least one of the on-board vehicle computer and the one or more user devices, where the notification is based on the predicted future vehicle service event and the generated vehicle valuation metric.

17 Claims, 4 Drawing Sheets

Related U.S. Application Data

(60) Provisional application No. 62/220,915, filed on Sep. 18, 2015.

(51) Int. Cl.
  *G07C 5/08* (2006.01)
  *G06Q 50/12* (2012.01)
  *G07C 5/00* (2006.01)
  *G06Q 10/10* (2012.01)

(52) U.S. Cl.
  CPC ....... *G07C 5/0841* (2013.01); *G06Q 10/1095* (2013.01); *G07C 5/008* (2013.01)

(58) Field of Classification Search
  USPC ................. 705/7.36, 7.35, 7.37; 701/33.4
  See application file for complete search history.

(56) References Cited

U.S. PATENT DOCUMENTS

| | | | |
|---|---|---|---|
| 2014/0025225 A1* | 1/2014 | Armitage | B60W 40/09 701/1 |
| 2014/0309852 A1* | 10/2014 | Ricci | H04W 4/21 701/34.4 |

* cited by examiner

SYSTEMS AND METHODS FOR VEHICLE TRACKING AND SERVICE PREDICTION

PRIORITY

This application is a continuation of U.S. patent application Ser. No. 15/268,489, filed on Sep. 16, 2016, which claims priority to U.S. Provisional Application No. 62/220,915 filed Sep. 18, 2015. The aforementioned applications are incorporated herein by reference in their entireties.

TECHNICAL FIELD

Embodiments of the present disclosure relate to, for example, registering the working of vehicles, determining maintenance and/or mileage information, data logging, and the use of devices linked to on-board diagnostics.

BACKGROUND

Vehicles today typically include control systems to control various aspects of the vehicle. Such control systems may be supervised or managed by an on-board vehicle computer. The on-board vehicle computer may include an on-board diagnostic port for obtaining information about the vehicle from the on-board vehicle computer. In current market conditions, the valuation of a vehicle is usually tied to the mileage of the vehicle, and the current state of the vehicle.

Several problems exist with conventional on-board vehicle computers, such as those described above. For example, third-parties, unlike users of a vehicle, may not be able assess the condition of a vehicle, or assess the change in valuation of the vehicle, as it is being operated. In some cases, however, such third-parties may be interested in ensuring that the vehicle maintains as high a valuation as possible (e.g., because the vehicle is being used as collateral to secure on obligation owed to the third-parties). As another example, a user of a vehicle typically does not have an easy way to predict when a next service event is needed. As a result, the user often cannot schedule an appointment with a service provider located at a convenient location for the user. As still another example, a user of a vehicle typically does not have access to analytics that help explain how the user can change vehicle servicing or driving habits in order to preserve the valuation of the vehicle.

SUMMARY

Embodiments of the present disclosure present technological improvements as solutions to one or more of the above-mentioned technical problems in conventional on-board computers. For example, in one embodiment, a processor-implemented vehicle tracking and prediction method is disclosed. The method includes sending, via one or more hardware processors, an electronic signal to activate in-vehicle data collection by an on-board data aggregator disposed in communication with each of (i) an on-board vehicle computer via an on-board diagnostic port and (ii) one or more user devices. The method further includes receiving, via the one or more hardware processors, aggregated in-vehicle data from the on-board data aggregator; and predicting, via the one or more hardware processors, a future vehicle service event based on the aggregated data. Further, the method includes generating, via the one or more hardware processors, a vehicle valuation metric based on the aggregated data; and sending, via the one or more hardware processors, a notification to at least one of the on-board vehicle computer and the one or more user devices, wherein the notification is based on the predicted future vehicle service event and the generated vehicle valuation metric.

In another embodiment, a vehicle tracking and prediction system is disclosed that includes one or more hardware processors and one or more memory units storing instructions executable by the one or more hardware processors for performing operations. The operations include sending, via the one or more hardware processors, an electronic signal to activate in-vehicle data collection by an on-board data aggregator disposed in communication with each of (i) an on-board vehicle computer via an on-board diagnostic port and (ii) one or more user devices. The operations further include receiving, via the one or more hardware processors, aggregated in-vehicle user data from the on-board data aggregator; and predicting, via the one or more hardware processors, a future vehicle service event based on the aggregated data. Further, the operations include generating, via the one or more hardware processors, a vehicle valuation metric based on the aggregated data; and sending, via the one or more hardware processors, a notification to at least one of the on-board vehicle computer and the one or more user devices, wherein the notification is based on the predicted future vehicle service event and the generated vehicle valuation metric.

In yet another embodiment, a non-transitory computer-readable medium is disclosed, storing instructions executable by one or more hardware processors for performing operations. The operations include sending, via one or more hardware processors, an electronic signal to activate in-vehicle data collection by an on-board data aggregator disposed in communication with each of (i) an on-board vehicle computer via an on-board diagnostic port and (ii) one or more user devices. The operations further include receiving, via the one or more hardware processors, aggregated in-vehicle user data from the on-board data aggregator; and predicting, via the one or more hardware processors, a future vehicle service event based on the aggregated data. Further, the operations include generating, via the one or more hardware processors, a vehicle valuation metric based on the aggregated data; and sending, via the one or more hardware processors, a notification to at least one of the on-board vehicle computer and the one or more user devices, wherein the notification is based on the predicted future vehicle service event and the generated vehicle valuation metric.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
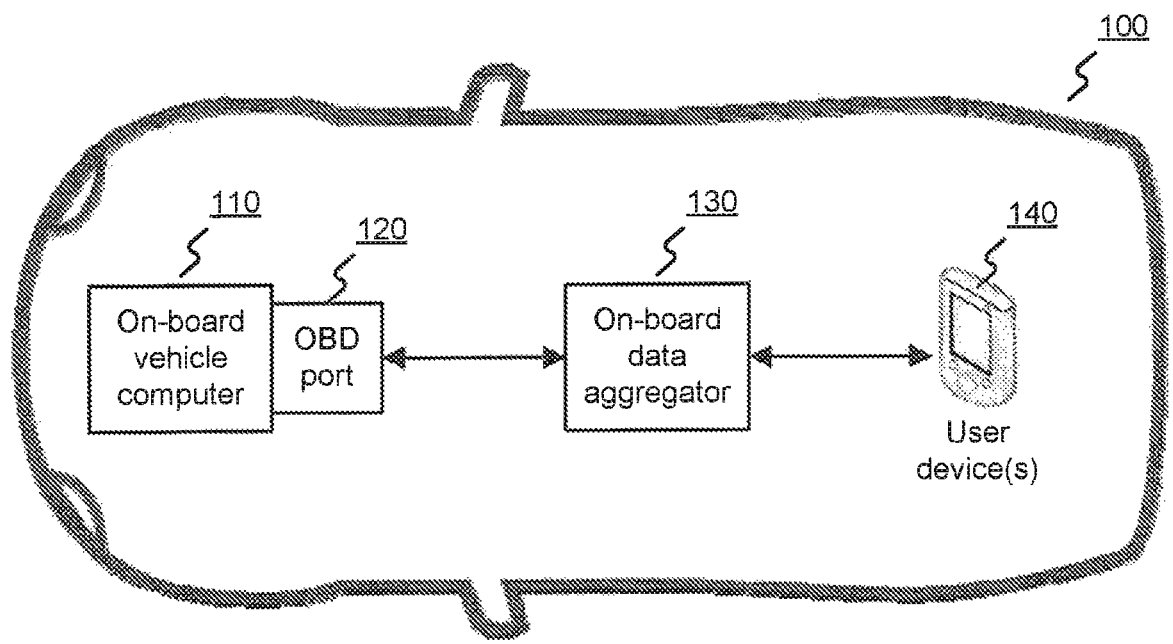
FIG. 1 is an exemplary block diagram of a vehicular system according to some embodiments.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure can gather data from a vehicle via an on-board diagnostics interface (e.g., an on-board diagnostics ("OBD") port) to the vehicle's on-board vehicle computer and aggregate the data into a predictable series of events, allowing for forecasting of when servicing may need to be performed on the vehicle and direct linking of the vehicle driver to a service provider for the servicing. Embodiments may also keep the driver or other users up to date on the trade-in value of the vehicle by tracking its mileage and can also inform them on ways to improve the trade-in value over time.

These and other embodiments, in addition to providing technological feedback to the driver(s) and/or modifying vehicle settings, may provide a financial institution with the ability to service their customers by using the data from a customer's vehicle and data about the customer to create a new user experience that permits the customer to know more about what is going on with the customer's vehicle and to be more informed about what service the customer has due. In this manner, the financial institution may provide its customers with more information about their vehicles to help keep them running in better condition. Additionally, the financial institution may ensure that its collateral—the vehicle—stays in better shape.

In some embodiments, a financial institution's customer may have a device that plugs into a vehicle's OBD port (e.g., an OBD2 port), or other interface to the vehicle's on-board computer, and reads information from that port (e.g., batch or streaming). The data read by the device may be used by the financial institution to predict future events for the customer. For example, it can predict when the vehicle's next oil change is supposed to be, or any other service interval recommended by the vehicle manufacturer. That information, combined with the financial institution's relationship with the customer's dealer, may enable the financial institution to directly link the customer to the dealership's service department, e.g., by receiving an indication from the customer's device to schedule the servicing, and to automatically send an electronic communication to the service department to schedule a reservation to service the vehicle.

In some embodiments, the financial institution can also inform the customer of the vehicle's trade-in value at any time by taking the mileage driven in the vehicle and communicating with (e.g., via an application programming interface (API)) a vehicle valuation service or other entity to get an estimate of the trade-in value. The trade-in value can be shared with the customer along with information on how the customer can improve the value and/or slow down the decrease in value. The financial institution may also be able to immediately notify the customer of vehicle recalls by interfacing with third-party vendors (e.g., car manufacturers, e.g., via an API) to determine when a vehicle recall has been issued.

FIG. 1 is an exemplary block diagram of a vehicular system according to some embodiments. In some embodiments a vehicle 100 may include an on-board vehicle computer 110. On-board vehicle computer 110 may supervise operation of various aspects of the vehicle 100, such as engine mapping settings, electronic transmission or steering characteristics, braking systems, engine cooling systems, suspension settings, passenger entertainment, air conditioning, automation of doors, windows, etc. On-board vehicle computer 110 may also collect various types of information related to the vehicle 100, such as revolutions per minute (RPM), speed, acceleration and braking rates, steering inputs, temperatures of air, water, oil, and other liquids, passenger comfort settings, etc. For example, various sensors set in different places within the vehicle may provide the information via input interfaces to the on-board vehicle computer 110.

On-board vehicle computer 110 may provide the collected information in a standardized structured data format to requesting devices via an OBD port (e.g., an OBD-II port according to the SAE J1962 standard). For example, in the vehicle 100 may be installed (either temporarily or permanently) an on-board data aggregator 130 (e.g., provided by a financial institution or other entity). On-board data aggregator 130 may request and receive data from the on-board vehicle computer 110 via OBD port 120. In some embodiments, one or more user device(s) 140 may be located within vehicle 100 and may be configured to allow on-board data aggregator 130 to obtain data from them. For example, on-board data aggregator 130 may obtain GPS data, user profile information, vibration data, gyroscope and/or accelerometer data, temperature, humidity, or other monitored environmental variables, etc., from the user devices 140. User devices 140 may include, without limitation, personal computer(s), server(s), various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like.

The computing systems in vehicle 100 may be implemented in the form of a server, general-purpose computer, dedicated hardware chip, a mainframe computer, laptop, smartphone, mobile device, or any combination of these components. In certain embodiments, the computing system may be configured as a particular apparatus, system, and the like based on the storage, execution, and/or implementation of the software instructions that perform one or more operations consistent with the disclosed embodiments. Computing system may be standalone, or it may be part of a subsystem, which may be part of a larger system. The computer may include one or more processors, memory storing programs, and peripheral I/O devices.

I/O devices may be one or more devices configured to allow data to be received and/or transmitted by a computing system. I/O devices may include one or more digital and/or analog communication devices that allow a computing system to communicate with other machines and devices, such as other components of system 200 discussed below in connection with FIG. 2. For example, a computing system may include interface components, which may provide interfaces to one or more input devices, such as one or more keyboards, mouse devices, and the like, which may enable the computing system to receive input from an operator of user device.

Figure 2:
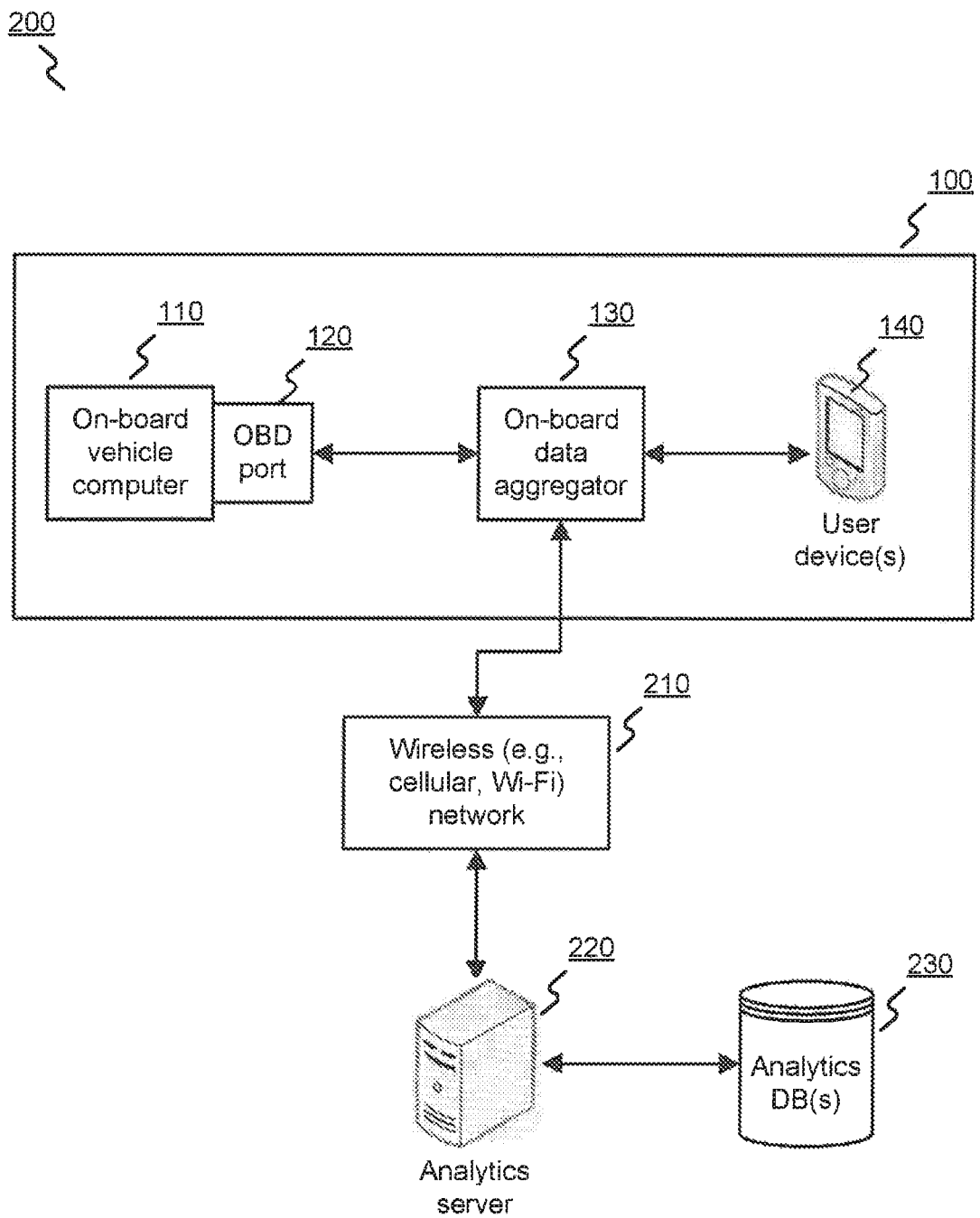
FIG. 2 is an exemplary block diagram of a vehicle tracking and service prediction system according to some embodiments.

FIG. 2 is an exemplary block diagram of a vehicle tracking and service prediction system 200 according to some embodiments. Continuing the discussion of FIG. 1 with reference now to FIG. 2, within a vehicle tracking and service prediction system 200 including the vehicle 100, the on-board aggregator 130 may combine the data from the on-board vehicle computer 110 and the user devices 140 into a standardized structured data format for sending to a computer located away from the vehicle 100. For example, the on-board data aggregator 130 may send the structured data via a wireless network 210 to analytics server 220, and/or for storage in an analytics database 230.

In some embodiments, a transceiver (not pictured) may be disposed in connection with the on-board data aggregator 130. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

Analytics server 220 may utilize data stored in analytics database 230 or obtained via wireless network 210 from on-board data aggregator 130, or directly from on-board vehicle computer 110 and/or user devices 140, to perform analytics for the benefit of a driver or passenger in the vehicle, or other customer or user, as described below in further detail.

The computing systems in system 200, including those included in vehicle 100, may be implemented in the form of a server, general-purpose computer, dedicated hardware chip, a mainframe computer, laptop, smartphone, mobile device, or any combination of these components. In certain embodiments, the computing system may be configured as a particular apparatus, system, and the like based on the storage, execution, and/or implementation of the software instructions that perform one or more operations consistent with the disclosed embodiments. Computing system may be standalone, or it may be part of a subsystem, which may be part of a larger system. The computer may include one or more processors, memory storing programs, and peripheral I/O devices.

The processors may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems. The processor may constitute a single core or multiple core processor that executes parallel processes simultaneously. For example, a processor may be a single core processor configured with virtual processing technologies. In certain embodiments, a processor may use logical processors to simultaneously execute and control multiple processes. A processor may implement virtual machine technologies, or other known technologies to provide the ability to execute, control, run, manipulate, store, etc., multiple software processes, applications, programs, etc. In another embodiment, a processor may include a multiple-core processor arrangement (e.g., dual, quad core, etc.) configured to provide parallel processing functionalities to allow the computing system to execute multiple processes simultaneously. One of ordinary skill in the art would understand that other types of processor arrangements could be implemented that provide for the capabilities disclosed herein. The disclosed embodiments are not limited to any type of processor(s).

Memory may include one or more storage devices configured to store instructions used by a processor to perform functions related to the disclosed embodiments. For example, memory may be configured with one or more software instructions, such as program(s) that may perform one or more operations when executed by a processor. The disclosed embodiments are not limited to separate programs or computers configured to perform dedicated tasks. For example, memory may include a program that performs the functions of any of the functional blocks of system 200. Additionally, a processor may execute one or more programs located remotely from another server or other computer. Memory may be a volatile or non-volatile, magnetic, semiconductor, tape, optical, removable, non-removable, or other type of storage device or tangible (e.g., non-transitory) computer-readable medium.

I/O devices may be one or more devices configured to allow data to be received and/or transmitted by a computing system. I/O devices may include one or more digital and/or analog communication devices that allow a computing system to communicate with other machines and devices. For example, a computing system may include interface components, which may provide interfaces to one or more input devices, such as one or more keyboards, mouse devices, and the like, which may enable the computing system to receive input from an operator of user device.

Figure 3:
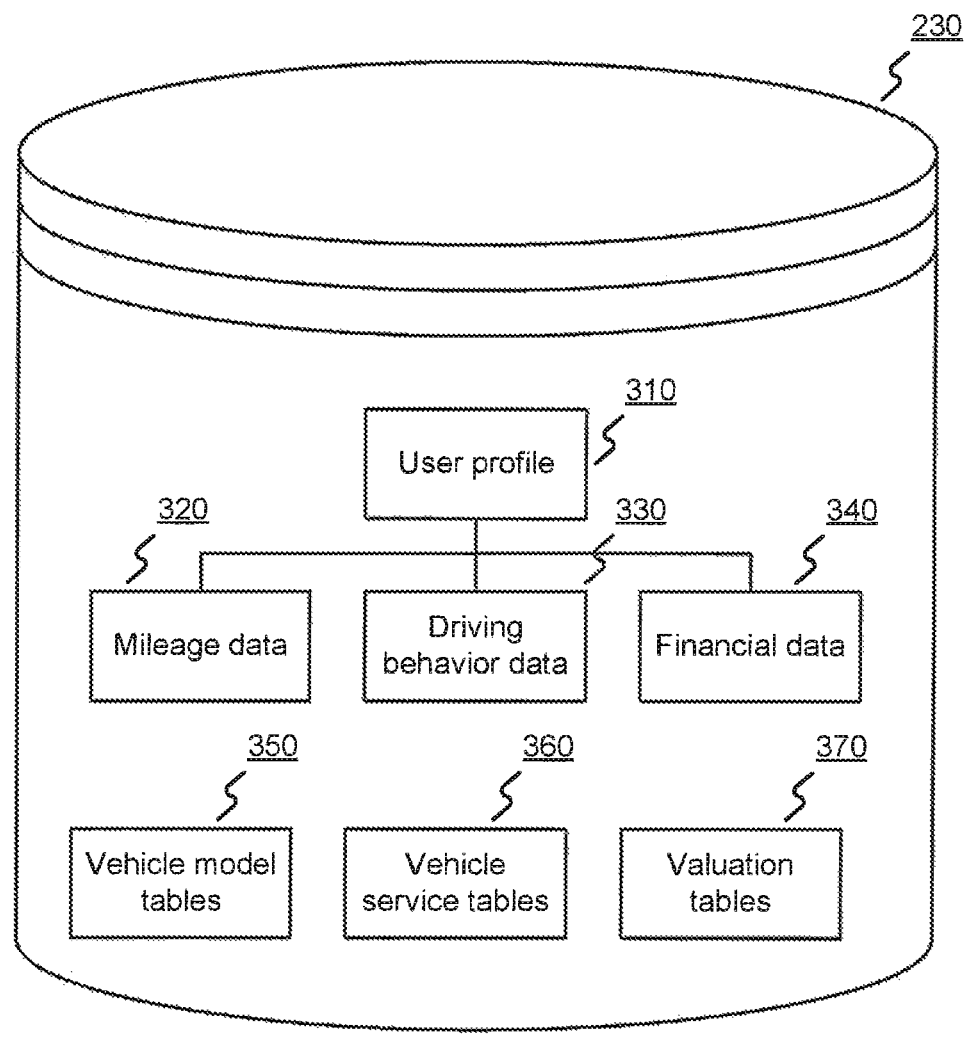
FIG. 3 is an exemplary block diagram of an analytics database system for a vehicle tracking and service prediction system according to some embodiments.

FIG. 3 is an exemplary block diagram of an analytics database system for a vehicle tracking and service prediction system according to some embodiments. The databases in system 200, including analytics database 230, may be implemented as fault-tolerant, relational, scalable, secure databases such as Oracle or Sybase databases. Alternatively, such databases may be implemented using standardized data structures, such as an array, hash, linked list, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

In some embodiments, analytics database 230 may store a variety of data types to facilitate vehicle tracking and service prediction analytics. For example, analytics database 230 may store a set of user profiles 310. Each user profile 310 may include data on a user, such as a user ID, user name, address, and biographical information. User profile 310 may also include relationship trees or social graphs connecting the user to other users within system 200.

In connection with a user profile 310, analytics database 230 may also store mileage data 320. For example, mileage data 320 may be obtained by on-board vehicle computer 110 by reading an odometer in vehicle 100. Thus, odometer data or mileage data 320 computed by the on-board vehicle computer 110 may be sent to analytics database 230 via on-board data aggregator 130, wireless network 210, and analytics server 220. As another example, mileage data 320 may be derived from GPS data obtained from a user device 140. The GPS data may be sent by user device 140 or on-board data aggregator 130 to analytics database 230 via on-board data aggregator 130, wireless network 210, and analytics server 220.

In connection with a user profile 310, analytics database 230 may also store driving behavior data 330. For example, driving behavior data 330 may be obtained by on-board vehicle computer 110 based on readings from various sensors in vehicle 100. For example, sensors in vehicle 100 may include braking sensors, acceleration sensors, throttle sensors, steering input sensors, clutch pedal sensors, transmission setting sensors, RPM gauges, speedometer gauges, etc. Thus, driving behavior data 330 may be computed by the on-board vehicle computer 110, which may send the raw data and/or processed information to analytics database 230 via on-board data aggregator 130, wireless network 210, and analytics server 220. As another example, driving behavior data 330 may be derived from GPS data, gyroscope, accelerometer, magnetometer and other sensor data obtained from a user device 140. The user device-based driving behavior data 330 may be sent by user device 140 or on-board data aggregator 130 to analytics database 230 via on-board data aggregator 130, wireless network 210, and analytics server 220. In some embodiments, on-board vehicle computer 110 and/or on-board data aggregator 130 may perform some analysis or other processing on the collected driving behavior data before sending it to the analytics database 230. For example, on-board vehicle computer 110 and/or on-board data aggregator 130 may perform a comparison of data collected from on-board vehicle computer 110 and user devices 140 to check if they are consistent with each other, and may filter data accordingly before sending the data to analytics database 230.

In connection with a user profile 310, analytics database 230 may also store financial data 340. For example, financial data 340 may comprise financial institution names and IDs, user financial account information, information on collateral related to user accounts (e.g., credit/lending/mortgage accounts), and/or vehicle valuations (e.g., resale value, trade-in value, depreciation, vehicle property taxes paid/owed, etc.).

In some embodiments, analytics database 230 may include vehicle model tables 350, vehicle service tables 360, and valuation tables 370. For example, vehicle model tables 350 may include data on various models of vehicles sold by different manufacturers, and include information on the models, such as model year, model number, class, year of make, vehicles options, and price for a new vehicle. Vehicle service tables 360 may include, for each model of vehicle, service events, mileage for service events, and/or other conditions that may apply to a service event, service to be performed, etc. Also, valuation tables 370 may include, for each model of vehicle, tables based on statistical analysis of aggregated empirical data (e.g., based on actual sales of vehicles) a listing of trade-in value, resale value, etc., of each model of vehicle by year of make, current condition, mileage, etc.

Figure 4:
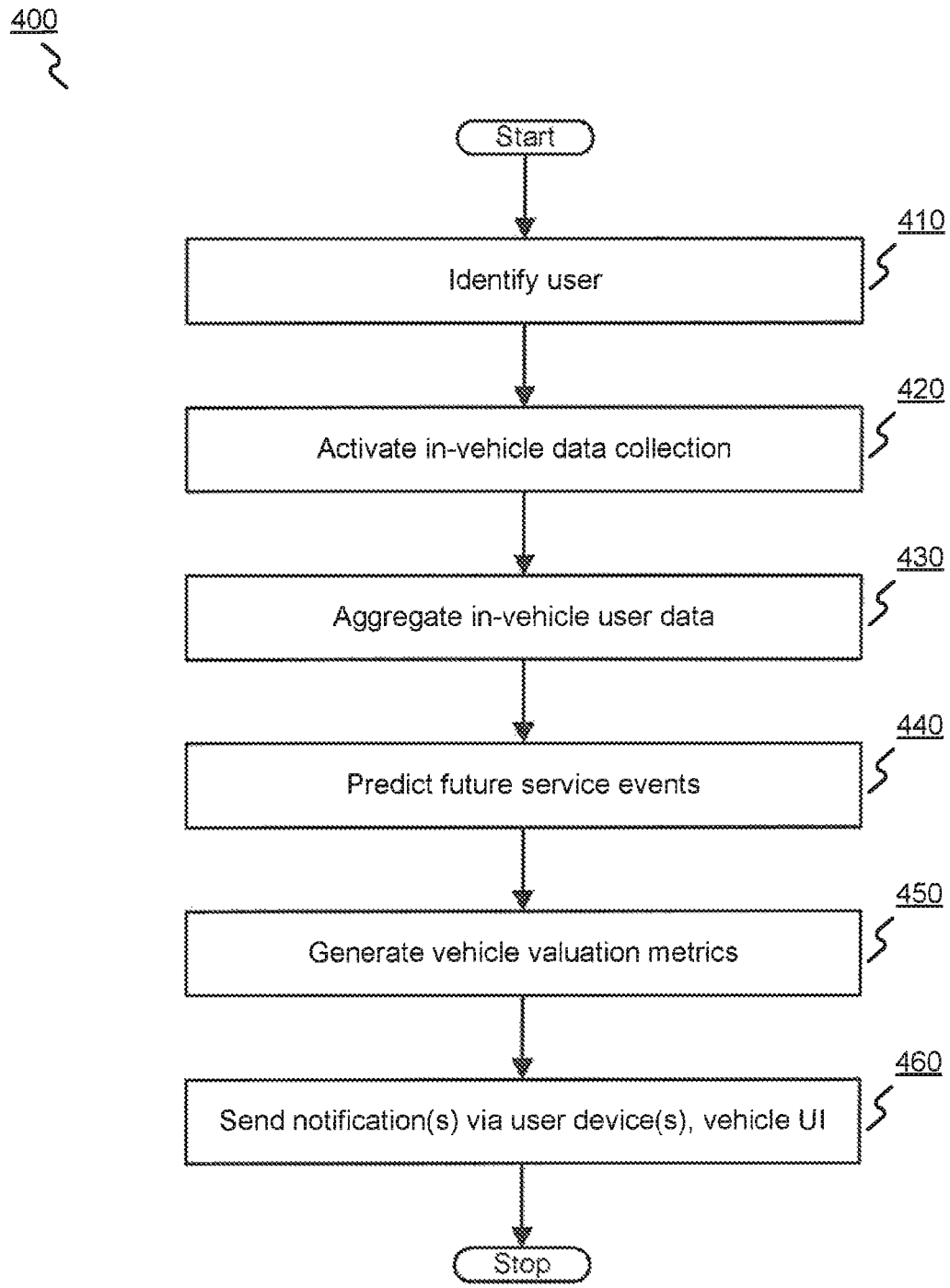
FIG. 4 is a flow diagram illustrating a vehicle tracking and service prediction method in accordance with some embodiments.

FIG. 4 is a flow diagram illustrating a vehicle tracking and service prediction method 400 in accordance with some embodiments. At step 410, a user device 140 and/or analytics server 220 may identify a user for whom analytics should be conducted. For example, a user may specifically request analytics for that user or for another related user (e.g., a second user listed in a relationship tree or social graph of the first user's profile stored in analytics database 230). In some embodiments, analytics server 220 may identify the user based on the particular user device 140 communicatively connected to on-board data aggregator 130 without a specific request by the user.

At step 420, in-vehicle data collection may be activated. For example, on-board data aggregator 130 may be triggered into executing its functions. On-board data aggregator 130 may access OBD port 120, and may request information thereby from on-board vehicle computer 110. On-board data aggregator 130 may also scan (e.g., via Wi-Fi or Bluetooth connection(s)) for user devices 140, and request data from any devices that are found. In some embodiments, steps 410 and 420 may be performed substantially in parallel.

At step 430, on-board data aggregator 130 may aggregate the information collected into a standardized structured data format. On-board data aggregator 130 may forward the standardized structured data via wireless network 210 to analytics server 220. Analytics server 220 may store the received data in analytics database 230.

At step 440, analytics server 220 may proceed with performing analytics on the received data. For example, analytics server 220 may predict future servicing events for the vehicle 100. For example, analytics server 220 may determine a current mileage for the vehicle and an average rate (e.g., miles/day) at which the vehicle accumulates mileage. Based on the current mileage and a current state of the vehicle (e.g., oil temperatures, air pressures, etc.), for example, analytics server 220 may determine a next service event for the vehicle (e.g., oil change, brake replacement, wheel alignment, etc.) and a mileage at which the next service event should ideally occur. Based on the average mileage rate, the analytics server 220 may determine when the next service event should likely be scheduled.

At step 450, analytics server may generate one or more vehicle valuation metrics for the vehicle 100 based on the aggregated data received from the on-board data aggregator 130 and/or user devices 140. For example, based on model information for the vehicle (e.g., obtained from a user profile 310 stored in analytics database 230) and a current mileage of the vehicle 100, analytics server 220 may look-up a valuation table 370 stored in analytics database 230 to estimate a valuation for the vehicle 100. In some embodiments, analytics server 220 may provide the model information and current mileage via an API to a third-party service provider's server, and in response receive valuation metrics for the vehicle 100.

At step 460, analytics server 220 may provide one or more notifications for presentation to user devices 140 and/or to on-board vehicle computer 110 for presentation on a user interface on board the vehicle 100. The presentations on the vehicle display and the user device 140 may be coordinated. For example, information on the valuation of the vehicle 100 may be presented on the user device 140 via a financial institution's application executing on the user device 140, whereas information about the next vehicle servicing event and the appointment information may be presented on the user interface of the vehicle 100, even though, in some cases, the information used to schedule the appointment was obtained from the user devices 140. In some embodiments, the information on the valuation of the vehicle 100 may include suggestions for maintaining the vehicle's value or slowing the down the rate of devaluation. For example, the one or more notifications may include a suggestion to lower the vehicle's average monthly mileage total from 250 miles per month to 200 miles per month. In some embodiments, the suggestion to lower the vehicle's average monthly mileage total may be made based on data accessed from valuation tables 370 indicating that the valuation for vehicles of the same or similar make and model as the user's vehicle 100 drops by a predetermined percentage after a certain mileage (e.g., a 10% drop in valuation after exceeding 100,000 miles).

In some embodiments, the analytics server 220 may automatically send an electronic request to a dealer of the vehicle 100 (e.g., by looking up dealer information from the user's profile) or other service personnel who are considered nearby the vehicle 100 based on the location history for the vehicle 100. In some embodiments, if an appointment can be scheduled with the service personnel electronically, the analytics server 220 may schedule the appointment electronically (e.g., through an API provided by the service personnel), and send a calendar invitation (e.g., an *.ical file) to a user device 140 or the on-board vehicle computer 110. In some embodiments, the analytics server 220 may first seek permission from a user via user device 140, or may notify the user via user device 140 before scheduling an appointment. In some embodiments, the analytics server 220 may obtain user input via user device 140, and use the obtained user input to schedule the appointment.

In some embodiments, information calculated for one user's vehicle 100 may be provided to another user in the first user's social graph or relationship tree. For example, information about a child's driving behavior and its effect on vehicle valuation, in addition to the need for vehicle servicing, may be provided to a parent of the child.

The specification has described systems and methods for vehicle tracking and service prediction. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An on-board data aggregator system installed in a vehicle, the system comprising:
   a wireless data transceiver;
   one or more hardware processors; and
   a memory unit storing instructions executable by the one or more hardware processors to perform operations comprising:
   receiving an electronic signal to activate in-vehicle data collection;
   sending a request for information to an on-board vehicle computer;
   receiving in-vehicle data from the computer, the in-vehicle data comprising data collected from one or more of a braking sensor, an acceleration sensor, a throttle sensor, a steering input sensor, a clutch pedal sensor, a transmission setting sensor, an RPM sensor, or a speed sensor;
   scanning to detect a user device;
   connecting to the user device via the wireless data transceiver;
   receiving user device sensor data from the user device via the wireless data transceiver;
   determining a vehicle condition based on the in-vehicle data and the user device sensor data, the determination comprising:
   comparing the in-vehicle data and the user device sensor data for consistency;
   filtering, based on the comparison, at least one of the in-vehicle data or the user device sensor data; and
   aggregating the in-vehicle data and the user device sensor data into a standardized structured data format;
   sending the vehicle condition and the aggregated data to an analytics server;
   receiving a notification from the analytics server based on the vehicle condition, the notification being based on stored financial data associated with a user of the user device and at least one of a predicted future vehicle service event, a vehicle valuation metric, or a recommendation to change a driving behavior; and
   displaying the received notification in coordination with a display of the received notification on the user device.

2. The system of claim 1, wherein the operations further comprise sending, to the user device, a user-device notification.

3. The system of claim 1, wherein the user device sensor data comprises data from at least one of a GPS, a gyroscope, an accelerometer, or a magnetometer.

4. The system of claim 1, wherein determining a vehicle condition comprises:
   comparing the in-vehicle data with the user device sensor data;
   assessing whether the in-vehicle data and the user device sensor data are consistent;
   combining the in-vehicle data and the user device sensor data; and
   filtering based on the assessment, the combined in-vehicle data and user device sensor data.

5. The system of claim 1, wherein determining a vehicle condition comprises:
   combining data from the computer with data from the user device.

6. The system of claim 1, wherein receiving the electronic signal comprises receiving from the user device.

7. The system of claim 1, wherein sending the vehicle condition and the aggregated data comprises;
sending the vehicle condition and the aggregated data via a wireless network.

8. The system of claim 1, wherein the vehicle condition comprises at least one of an engine condition, a brake condition, a wheel alignment condition, or a suspension condition.

9. The system of claim 1, wherein the wireless data transceiver comprises at least one of a Bluetooth transceiver, a WiFi transceiver, or a Near Field Communication transceiver.

10. A method, comprising:
receiving, by an on-board data aggregator comprising a wireless data transceiver, an electronic signal to activate in-vehicle data collection;
sending, by the data aggregator, a request for information to an on-board vehicle computer;
receiving, by the data aggregator, in-vehicle data from the computer, the in-vehicle data comprising data collected from one or more of a braking sensor, an acceleration sensor, a throttle sensor, a steering input sensor, a clutch pedal sensor, a transmission setting sensor, an RPM sensor, or a speed sensor;
scanning to detect a user device;
connecting to the user device via the wireless data transceiver;
receiving user device sensor data from the user device via the wireless data transceiver;
determining a vehicle condition based on the in-vehicle data and the user device sensor data, the determination comprising:
comparing the in-vehicle and the user device sensor data for consistency;
filtering, based on the comparison, at least one of the in-vehicle data or the user device sensor data; and
aggregating the in-vehicle data and the user device sensor data into a standardized structured data format;
sending, via the on-board data aggregator, the vehicle condition and the aggregated data to an analytics server;
receiving, by the on-board data aggregator, a notification from the analytics server based on the vehicle condition, the notification being based on stored financial data associated with a user of the user device and at least one of a predicted future vehicle service event, a vehicle valuation metric, or a recommendation to change a driving behavior; and
displaying the received notification in coordination with a display of the received notification on the user device.

11. The method of claim 10, further comprising:
sending, to the user device, a user-device notification.

12. The method of claim 10, wherein the user device sensor data comprises:
data from at least one of a GPS, a gyroscope, an accelerometer, or a magnetometer.

13. The method of claim 10, further comprising:
receiving, from the user device, user device sensor data; and
wherein determining vehicle treatment data comprises:
comparing, by the data aggregator, the in-vehicle data with the user device sensor data;
assessing, by the data aggregator, whether the in-vehicle data and the user device sensor data are consistent;
combining, by the data aggregator, the in-vehicle data and the user device sensor data; and
filtering, by the data aggregator, based on the assessment, the combined in-vehicle data and user device sensor data.

14. The method of claim 10, wherein determining the vehicle condition comprises:
combining data from the computer with data from the user device.

15. The method of claim 10, wherein the vehicle condition comprises at least one of an engine condition, a brake condition, a wheel alignment condition, or a suspension condition.

16. The method of claim 10, wherein the wireless data transceiver comprises at least one of a Bluetooth transceiver, a WiFi transceiver, or a Near Field Communication transceiver.

17. A non-transitory computer-readable medium storing instructions executable by one or more hardware processors to carry out operations comprising:
receiving, via the one or more hardware processors, an electronic signal to activate in-vehicle data collection;
sending, via the one or more hardware processors, a request for information to an on-board vehicle computer;
receiving, via the one or more hardware processors, in-vehicle data from an on-board vehicle computer, the in-vehicle data comprising data collected from one or more of a braking sensor, an acceleration sensor, a throttle sensor, a steering input sensor, a clutch pedal sensor, a transmission setting sensor, an RPM sensor, or a speed sensor;
scanning, by the one or more hardware processors, to detect a user device;
connect to the user device via a wireless data transceiver;
receiving user device sensor data from the user device via the wireless data transceiver;
determining, via the one or more hardware processors, a vehicle condition based on the in-vehicle data and the user device sensor data, the determination comprising:
comparing the in-vehicle and the user device sensor data for consistency;
filtering, based on the comparison, at least one of the in-vehicle data or the user device sensor data; and
aggregating the in-vehicle data and the user device sensor data into a standardized structured data format;
sending, via the one or more hardware processors, the vehicle condition and the aggregated data to an analytics server;
receiving, via the one or more hardware processors, a notification from the analytics server based on the vehicle condition, the notification being based on stored financial data associated with a user of the user device and at least one of a predicted future vehicle service event, a vehicle valuation metric, or a recommendation to change a driving behavior; and
displaying the received notification in coordination with a display of the received notification on the user device.

* * * * *